(No Model.)
O. LUND.
ARTIFICIAL TOOTH.
No. 422,350.                    Patented Feb. 25, 1890.
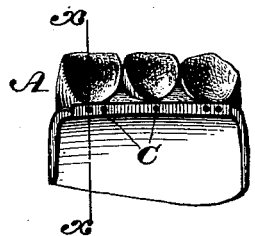
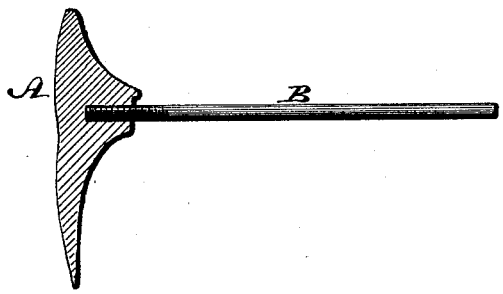  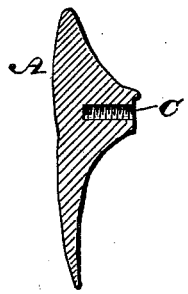
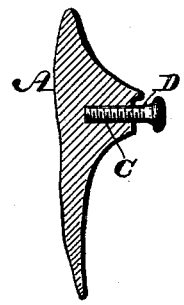
WITNESSES:
L. Douville,
P. H. Cagle.
INVENTOR
Oliver Lund
BY John A. Diederoheim
ATTORNEY.

UNITED STATES PATENT OFFICE.

OLIVER LUND, OF PHILADELPHIA, PENNSYLVANIA, ASSIGNOR TO JOHNSON & LUND, OF SAME PLACE.

ARTIFICIAL TOOTH.

SPECIFICATION forming part of Letters Patent No. 422,350, dated February 25, 1890.

Application filed December 28, 1889. Serial No. 335,185. (No model.)

*To all whom it may concern:*

Be it known that I, OLIVER LUND, a citizen of the United States, residing in the city and county of Philadelphia, State of Pennsylvania, have invented a new and useful Improvement in Artificial Teeth, which improvement is fully set forth in the following specification and accompanying drawings.

My invention consists of an improvement in the manufacture of porcelain artificial teeth, whereby platinum pins or pivots are dispensed with.

Figure 1 represents a rear view of artificial teeth embodying my invention. Figs. 2, 3, and 4 represent sections thereof on line $x\,x$, Fig. 1, on an enlarged scale, the same illustrating different steps of the invention.

Similar letters of reference indicate corresponding parts in the several figures.

Referring to the drawings, A represents a porcelain or artificial tooth, which is molded in the ordinary manner, and instead of having a platinum pin or pivot embedded thereinto, as usual, I employ a screw B of inferior metal—such as brass—which screw is molded into the body of the tooth in the place coincident to such pin or pivot.

As soon as the tooth is sufficiently dry to deliver from the mold the screw is removed by carefully turning it, thus leaving a screw-threaded opening C in the body of the tooth. The tooth is now burned or fused, the screw-threaded opening being preserved therein. A screw D, with or without a head, and formed of brass, copper, or other metal inferior to platinum, is now fitted into the opening C, said screw providing means for securing the tooth to the base-plate.

If desired, the screw D may be dispensed with, and rubber, celluloid, or other pliable material employed for a base-plate may be pressed into the threaded opening C and assume the shape of said threaded opening, so that when the material hardens it will take firmly hold of the tooth, and thereby securely connect the tooth with the plate.

Having thus described my invention, what I claim as new, and desire to secure by Letters Patent, is—

1. An artificial tooth having a screw-threaded opening baked or fused in the body thereof, substantially as described.

2. An artificial tooth having a screw-threaded opening in the body thereof, substantially as described.

OLIVER LUND.

Witnesses:
JOHN A. WIEDERSHEIM,
A. P. JENNINGS.